(12) United States Patent
Chaturvedi et al.

(10) Patent No.: US 12,165,413 B2
(45) Date of Patent: Dec. 10, 2024

(54) METHODS AND APPARATUSES FOR OCCLUSION DETECTION

(71) Applicant: Sensormatic Electronics, LLC, Boca Raton, FL (US)

(72) Inventors: Yash Chaturvedi, Panathur (IN); Joseph Celi, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 419 days.

(21) Appl. No.: 17/523,516

(22) Filed: Nov. 10, 2021

(65) Prior Publication Data

US 2023/0145016 A1    May 11, 2023

(51) Int. Cl.
*G06K 9/00*    (2022.01)
*G06T 7/20*    (2017.01)
*G06V 10/22*    (2022.01)
*G06V 20/52*    (2022.01)
*G06V 40/10*    (2022.01)

(52) U.S. Cl.
CPC ............. *G06V 20/52* (2022.01); *G06T 7/20* (2013.01); *G06V 10/22* (2022.01); *G06V 40/10* (2022.01)

(58) Field of Classification Search
CPC ........ G06V 20/52; G06V 10/22; G06V 40/10; G06V 20/593; G06V 40/20; G06V 10/82; G06V 10/764; G06V 20/58; G06V 10/25; G06V 10/454; G06V 10/62; G06V 20/41; G06V 20/46; G06V 40/172; G06V 10/255; G06V 10/774; G06V 20/56; G06V 20/64; G06V 30/19173; G06V 10/267; G06V 10/50; G06T 7/20; G06T 2207/20084; G06T 2207/10016; G06T 2207/20081; G06T 7/74; G06T 7/248; G06T 2207/10028; G06T 2210/12; G06T 7/246; G06T 2207/30261; G06T 7/70; G06T 7/11
See application file for complete search history.

(56) References Cited

U.S. PATENT DOCUMENTS

| 9,996,818 | B1* | 6/2018 | Ren ................... G06F 16/5866 |
| 10,915,783 | B1* | 2/2021 | Hallman ............... G06N 3/02 |
| 2009/0063307 | A1 | 3/2009 | Groenovelt et al. |
| 2014/0211985 | A1 | 7/2014 | Polese et al. |

(Continued)

OTHER PUBLICATIONS

Hao, Yu, et al. "Take goods from shelves: A dataset for class-incremental object detection." Proceedings of the 2019 on international conference on multimedia retrieval (2019), pp. 271-278. (Year: 2019).*

(Continued)

*Primary Examiner* — Alex Kok S Liew
(74) *Attorney, Agent, or Firm* — ARENTFOX SCHIFF LLP (57) ABSTRACT

Aspects of the present disclosure include methods, systems, and non-transitory computer readable media for receiving an initial image of the area, receiving an updated image of the area, detecting at least one of a person in the area or a movement in the area based on the updated image, comparing the updated image and the initial image to identify a change in the area, and determining a presence or an absence of the occlusion based on the change in the area and the at least one of the person or the movement in the area.

18 Claims, 4 Drawing Sheets

(56) References Cited

U.S. PATENT DOCUMENTS

| | | | |
|---|---|---|---|
| 2015/0052029 A1* | 2/2015 | Wu | G06Q 10/087 |
| | | | 705/28 |
| 2015/0262116 A1* | 9/2015 | Katircioglu | G06Q 10/087 |
| | | | 705/28 |
| 2015/0379366 A1* | 12/2015 | Nomura | G06F 18/22 |
| | | | 382/203 |
| 2019/0130189 A1* | 5/2019 | Zhou | G06V 10/7515 |
| 2019/0213421 A1* | 7/2019 | Adato | H04N 23/51 |
| 2020/0097756 A1* | 3/2020 | Hashimoto | G06V 10/25 |
| 2020/0380274 A1* | 12/2020 | Shin | G06V 20/58 |
| 2021/0125409 A1* | 4/2021 | Mirza | G06V 40/20 |
| 2021/0158430 A1* | 5/2021 | Buibas | H04B 3/02 |

OTHER PUBLICATIONS

Inagaki, Yusuke, et al. "Detecting layered structures of partially occluded objects for bin picking." 2019 IEEE/RSJ International Conference on Intelligent Robots and Systems (IROS). IEEE, 2019, pp. 5786-5791. (Year: 2019).*

International Search Report in PCT/US2022/079443, mailed Feb. 10, 2023, 6 pages.

Written Opinion in PCT/US2022/079443, mailed Feb. 10, 2023, 8 pages.

* cited by examiner

METHODS AND APPARATUSES FOR OCCLUSION DETECTION

TECHNICAL FIELD

Aspects of the present disclosure relates to occlusion detection.

BACKGROUND

In some environments, it may be desirable to monitor an area using one or more cameras for product availabilities, occupancy levels, and/or other information. However, the area may be obscured by objects (i.e., occlusions) not readily identifiable by conventional personnel/objection identification mechanisms. While some machine learning systems may be implemented to identify occlusions, the machine learning systems are generally resource intensive and require large data sets and extensive trainings. Therefore, improvements may be desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure include methods, systems, and non-transitory computer readable media for receiving an initial image of the area, receiving an updated image of the area, detecting at least one of a person in the area or a movement in the area based on at least the updated image, comparing the updated image and the initial image to identify a change in the area, and determining a presence or an absence of the occlusion based on the change in the area and the at least one of the person or the movement in the area.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

In some instances, retail employees may spend time walking within a retail store checking whether shelves should be restocked with new merchandise. This may be a time consuming process. While conventional shelf monitoring systems may be implemented to reduce the time the retail employees need to spend to monitor shelves, occlusions of the shelf view by people, shopping cart trolleys, pallets, etc., may obscure the view of the conventional shelf monitoring systems. Although person detection algorithms may be implemented by the conventional shelf monitoring systems, certain postures of people may not be detected. For example, if a person (e.g., shopper) bends to search for a particular item on the lower shelf, or the person is not in a standing position, there are chances that the person detection algorithms may miss the occlusion (e.g., shopper). As a result, the conventional shelf monitoring system may generate sweeping and/or replenishment alerts.

In certain aspects of the present disclosure, a system for detecting occlusion may implement image processing methods to detect occlusion. The system may detect the occlusion of people and/or objects without using complex mathematical operations (e.g., machine learning algorithms). Aspects of the present disclosure includes using person and/or motion based occlusion detection, and scene change based occlusion detection model to detect occlusion.

An aspect of the present disclosure includes a system that detects an occlusion in an area (e.g., shelf, waiting line, waiting area, etc.). The system may perform a preprocessing of image frames and computes the difference between two image frames. Based on the difference, the system calculates the surface area of closed contours. If the surface area is greater than a first predefined threshold, the contour is marked as possible occlusion. This method may be implemented to detect moving people, objects, etc.

Additionally, according to an aspect of the present disclosure, the system may implement the scene change based detection. The system may capture an initial image of the area, which is free from any occlusion at the time of capturing. When detecting occlusion, the system may compare a current image and the initial image to identify the absolute difference of the two images. Based on the difference, the system may calculate the surface area of the closed contours. If the surface area is larger than a second predefined threshold, the contour may be marked as possible occlusion.

Figure 1:
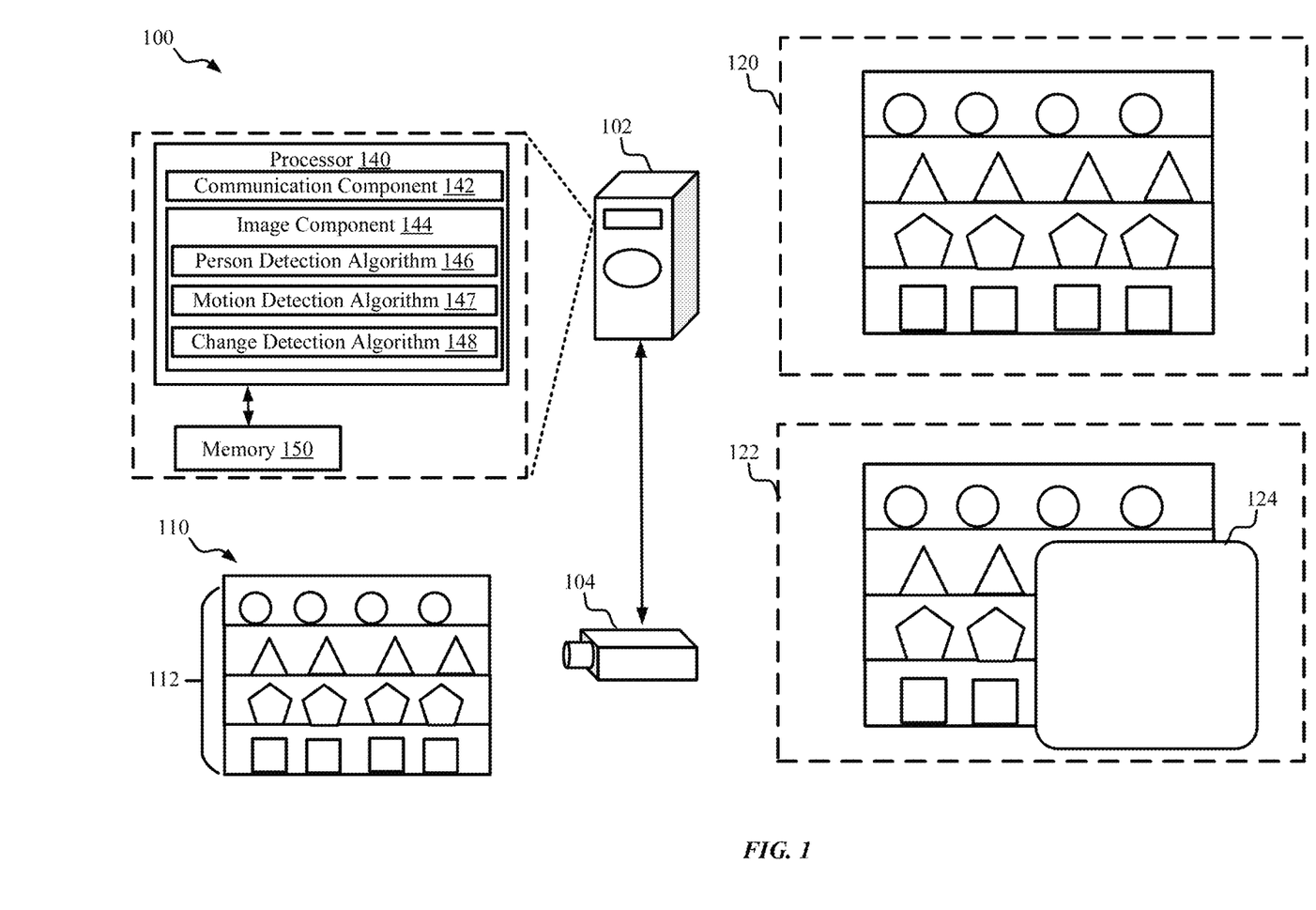
FIG. 1 illustrates an example of an environment for detecting an occlusion in accordance with aspects of the present disclosure.

Referring to FIG. 1, in a non-limiting implementation, an example of an environment 100 for detecting an occlusion is shown according to aspects of the present disclosure. The environment 100 may include a detection system 102. The environment 100 may include at least one image capturing device 104. The image capturing device 104 may be a camera, a video recorder, or other suitable devices configured to capture images. The detection system 102 may include a processor 140 that executes instructions stored in a memory 150 for performing the functions described herein.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, controllers, digital signal processors (DSPs), field programmable gate arrays (FPGAs), programmable logic devices (PLDs), state machines, gated logic, discrete hardware circuits, and other suitable hardware configured to perform the various functionality described herein.

In some aspects, the detection system 102 may include memory 150. The memory 150 may include software instructions and/or hardware instructions. The processor 140 may execute the instructions to implement aspects of the present disclosure.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM).

In certain aspects, the processor 140 may include a communication component 142 configured to communicate with external devices via one or more wired and/or wireless connections (not shown). The processor 140 may include an image component 144 configured to identify occlusions from images captured by the image capturing device 104. The image component 144 may include a person detection algorithm 146 configured to detect one or more people in an image. The image component 144 may include a motion detection algorithm 147 configured to detect one or more motions of a person or an object in an image. The image component 144 may include a change detection algorithm 148 configured to detect one or more changes in an image.

During operation, the detection system 102 may monitor an area for available space. Examples of the area may include a shelf in a retail store, a line in a retail store or a public service location, a waiting room, and/or a compartment of a transportation vehicle. The detection system 102 may capture an initial image of the area. The initial image may be an image of the area with no occlusion. During the monitoring of the area, the detection system 102 may capture an updated image of the area. The detection system 102 may utilize the image component 144, the person detection algorithm 146, the motion detection algorithm 147, and/or the change detection algorithm 148 to detect one or more of a person, an object, or a movement, and a change between the initial image and the updated image. Based on the detected person, object, or movement, and the change, the detection system 102 may determine the presence or absence of an occlusion.

In an example, the detection system 102 may monitor an area, such as a shelf 110 having merchandise items 112. The image capturing device 104 may capture an initial image 120 of the shelf 110 without any occlusion. The initial image 120 of the shelf 110 may be stored in the memory 150. The detection system 102 may monitor the shelf 110 at a later time. For example, the detection system 102 may monitor the shelf 110 hourly, daily, weekly, etc. The detection system 102 may monitor the shelf 110 to determine whether the shelf 110 requires restocking of the merchandise items 112.

In some aspects, the detection system 102 may capture an updated image 122 of the shelf 110. The updated image 122 may include an occlusion 124 obstructing a portion of the shelf 110 and/or the merchandise items 112. The occlusion 124 may be an object (e.g., a crate) placed in front of the shelf 110. Based on the updated image 122, a portion of the shelf 110 may appear to be empty due to the occlusion 124 (i.e., some of the merchandise items 112 may appear to have been taken by customers). In an optional implementation, the image component 144 may execute the person detection algorithm 146 to determine whether the occlusion 124 is a person obstructing a portion of the shelf 110. The person detection algorithm 146 may determine that the updated image 122 does not include a person. Alternatively or additionally, the image component 144 may execute the motion detection algorithm 147 to determine whether the occlusion 124 is a moving object by comparing the updated image 122 with a previous image (not shown) captured by the image capturing device 104. The previous image may be captured 10 milliseconds, 100 milliseconds, 1 second, 2 seconds, 5 seconds, 10 seconds, or more time before the capturing of the updated image 122. Based on the updated image 122 and the previous image, the motion detection algorithm 147 may determine that the occlusion 124 is not a moving object.

In one aspect of the present disclosure, the image component 144 may execute the change detection algorithm 148. The change detection algorithm 148 may compare the updated image 122 and the initial image 120 to determine a difference (i.e., presence of the occlusion 124) between the two images. Based on the comparison, the change detection algorithm 148 may determine a presence of an object obstructing the shelf 110 (i.e., the occlusion 124). In response to detecting the occlusion 124, the detection system 102 may withhold transmitting a signal to alert one or more employees to restock the shelf 110. The detection system 102 may periodically monitor the shelf 110 until the occlusion 124 is removed.

In some aspects, after the occlusion 124 is removed, if some or all of the shelf 110 is empty (i.e., some or all of the merchandise items 112 are taken), the detection system 102 may transmit a signal to alert one or more employees to restock the shelf 110. The detection system 102 may compute available space (e.g., available spaces on the shelf 110, number of merchandise items to be replaced, etc.) based on the images. After the transmission of the signal, the detection system 102 may resume the monitoring later. In some instances, the detection system 102 may resume the monitoring if no restocking is necessary.

In other aspects of the present disclosure, the detection system 102 may be implemented to detect whether the seating areas of a transportation vehicle (or a waiting room) is empty, partially, or fully occupied. For example, the detection system 102 may be implemented to determine whether there are any available seats in the seating area. If there is an occlusion to viewing the seating areas, the detection system 102 may suspend reporting any available seats until the occlusion is removed. If the detection system 102 does not detect any occlusion, the detection system 102 may compute the available space (e.g., number of empty seats) in the seating area.

Figure 2:
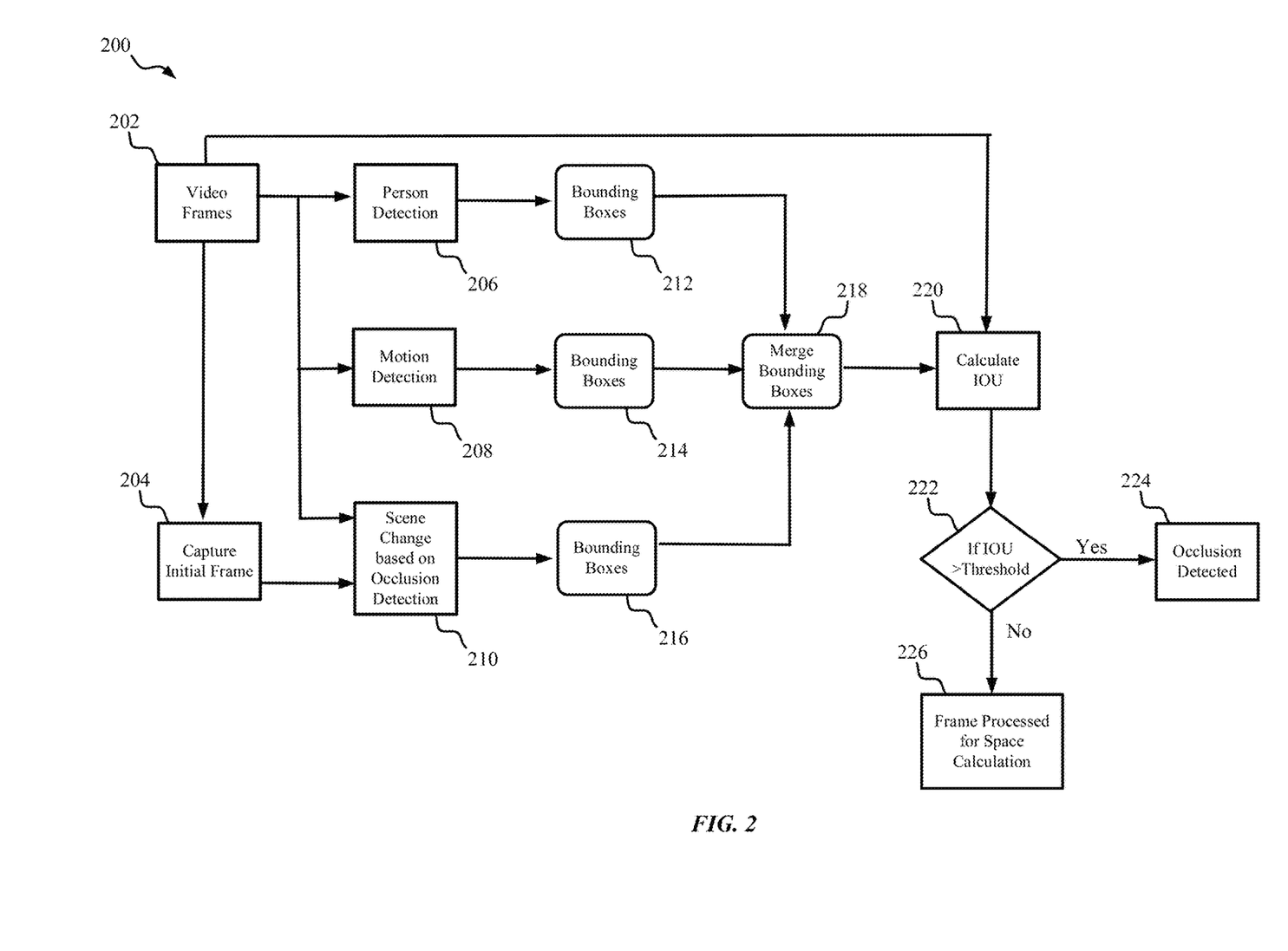
FIG. 2 illustrates an example of a functional diagram for detecting an occlusion in accordance with aspects of the present disclosure.

Turning to FIG. 2, an example of a method 200 for detecting occlusion may include capturing video frames (202). The method 200 may capture an initial frame (204). Based on the captured video frames, the method 200 may implement person detection (206), motion detection (208), and/or scene change based on occlusion detection (210). The method 200 may generate bound boxes (212) around any person detected in the captured video frames. The method 200 may generate bound boxes (214) around any motion detected in the captured video frames. The method 200 may generate bound boxes (216) around any changes in the scene. The method 200 may merge the bound boxes (218). The method 200 may calculate the intersection over union (220) of the merged bound boxes. At (222), if the intersection over union is greater than a predetermined threshold, the method 200 may determine that an occlusion is detected (224). If the intersection over union is less than the predetermined threshold, the method 200 may process the frames for space calculations (226).

Figure 3:
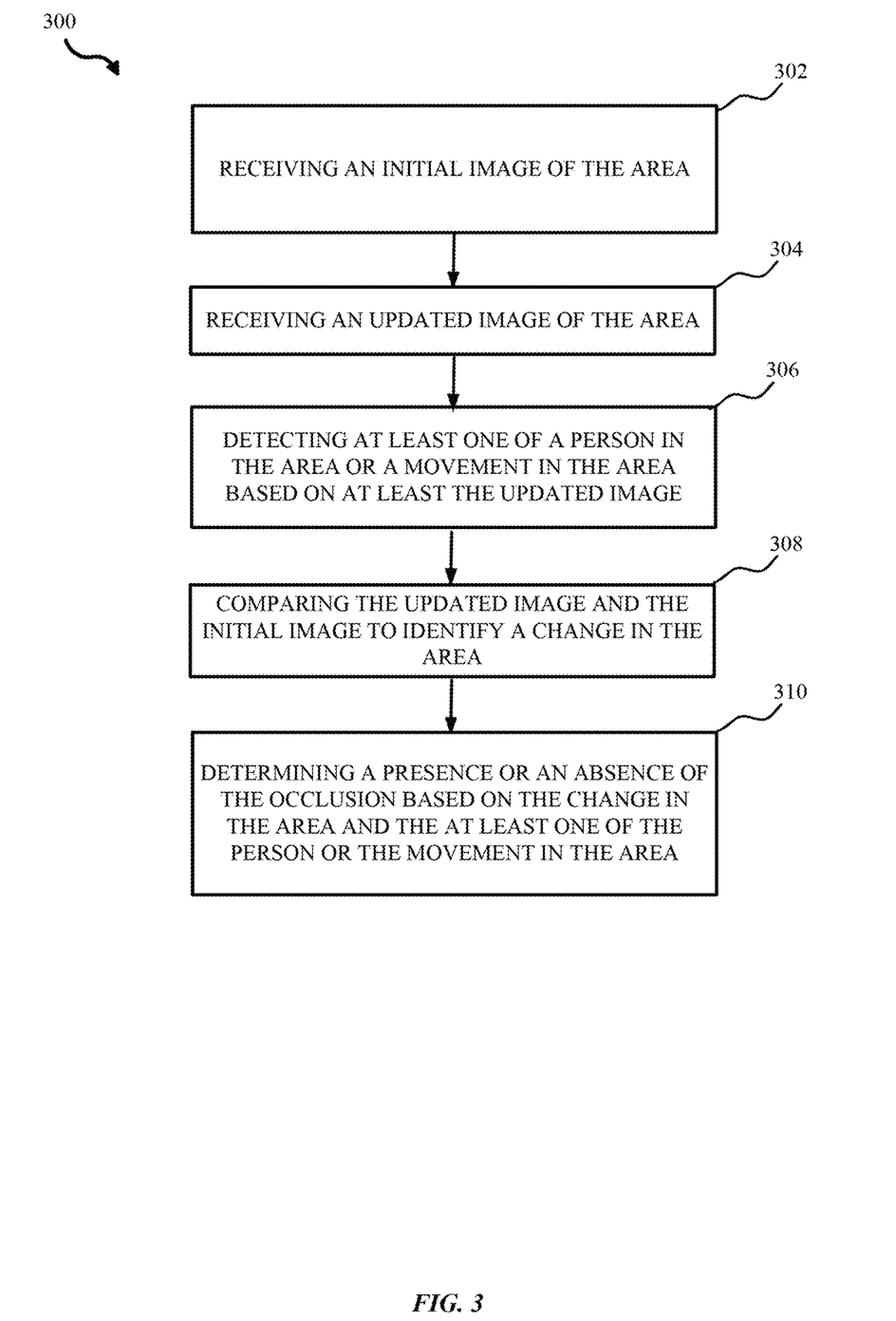
FIG. 3 illustrates an example method for detecting an occlusion in accordance with aspects of the present disclosure.

Turning to FIG. 3, an example of a method 300 for detecting occlusion may be implemented by the detection system 102, the image capturing device 104, the processor 140, the communication component 142, the image component 144, the person detection algorithm 146, the motion detection algorithm 147, the change detection algorithm 148, and/or the memory 150. One or more of the detection system 102, the image capturing device 104, the processor 140, the communication component 142, the image component 144, the person detection algorithm 146, the motion detection algorithm 147, the change detection algorithm 148, and/or the memory 150 may be configured to or provide means for implementing aspects of the method 300.

At block 302, the method 300 may receive an initial image of an area. The detection system 102, the image capturing device 104, the processor 140, the communication component 142, the image component 144, and/or the memory 150 may be configured to or provide means for receiving an initial image of the area.

At block 304, the method 300 may receive an updated image of the area. The detection system 102, the image capturing device 104, the processor 140, the communication component 142, the image component 144, and/or the memory 150 may be configured to or provide means for receiving an updated image of the area.

At block 306, the method 300 may detect at least one of a person in the area or a movement in the area based at least on the updated image. The detection system 102, the image capturing device 104, the processor 140, the communication component 142, the image component 144, the person detection algorithm 146, the motion detection algorithm 147, and/or the memory 150 may be configured to or provide means for detecting at least one of a person in the area or a movement in the area based on the updated image.

At block 308, the method 300 may compare the updated image and the initial image to identify a change in the area. The detection system 102, the image capturing device 104, the processor 140, the communication component 142, the image component 144, the change detection algorithm 148, and/or the memory 150 may be configured to or provide means for comparing the updated image and the initial image to identify a change in the area.

At block 310, the method 300 may determine a presence or an absence of the occlusion based on the change in the area and the at least one of the person or the movement in the area. The detection system 102, the image capturing device 104, the processor 140, the communication component 142, the image component 144, the person detection algorithm 146, the motion detection algorithm 147, the change detection algorithm 148, and/or the memory 150 may be configured to or provide means for determining a presence or an absence of the occlusion based on the change in the area and the at least one of the person or the movement in the area.

Aspects of the present disclosure includes the method above, wherein determining the presence of the occlusion comprises detecting the person or the movement, generating a first bounding box around the person or the movement, generating a second bounding box around the change in the area, merging the first bounding box and the second bounding box into a merged bounding box, calculating an intersection over union value based on at least one of the first bounding box, the second bounding box, or the merged bounding box, comparing the intersection over union value to a threshold value, and detecting the occlusion in response to the intersection over union value being greater than the threshold value.

Aspects of the present disclosure includes any of the methods above, further comprising refraining from calculating an available space in the area until a removal of the occlusion occurs.

Aspects of the present disclosure includes any of the methods above, further comprising, in response to determining the absence of the occlusion, calculating an available space in the area.

Aspects of the present disclosure includes any of the methods above, further comprising transmitting a message indicating the available space in the area.

Aspects of the present disclosure includes any of the methods above, wherein the area is a shelf in a store and further comprising determining an amount of merchandise to replenish the shelf based on the available space in the shelf, wherein the message indicates the amount of merchandise.

Aspects of the present disclosure includes any of the methods above, wherein the area is one of a shelf, a line in a store, a waiting area, or a compartment of a transportation vehicle.

Figure 4:
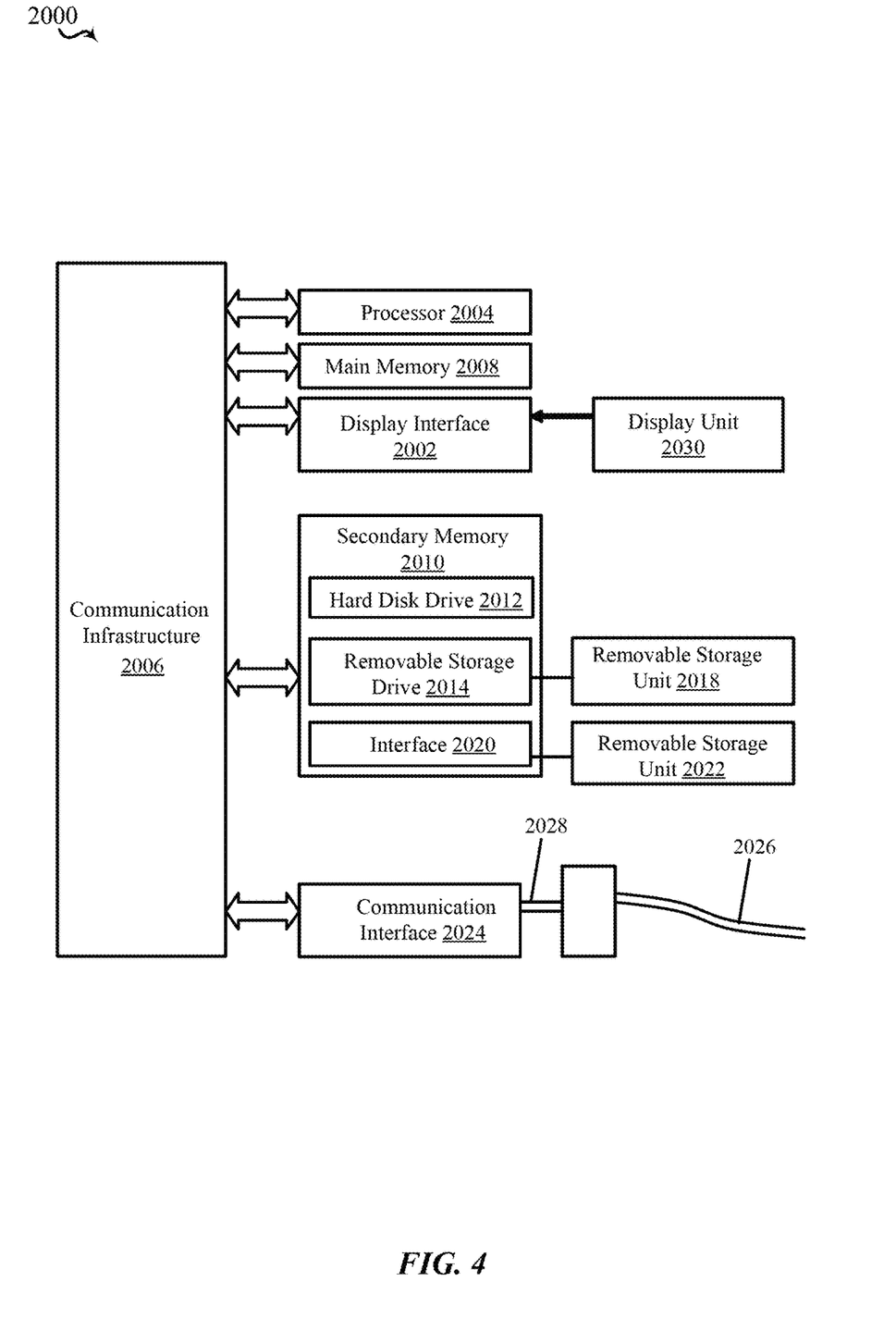
FIG. 4 illustrates an example of a computer system in accordance with aspects of the present disclosure.

Aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 2000 is shown in FIG. 4. In some examples, the detection system 102 may be implemented as the computer system 2000 shown in FIG. 4. The detection system 102 may include some or all of the components of the computer system 2000.

The computer system 2000 includes one or more processors, such as processor 2004. The processor 2004 is connected with a communication infrastructure 2006 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 2000 may include a display interface 2002 that forwards graphics, text, and other data from the communication infrastructure 2006 (or from a frame buffer not shown) for display on a display unit 2030. Computer system 2000 also includes a main memory 2008, preferably random access memory (RAM), and may also include a secondary memory 2010. The secondary memory 2010 may include, for example, a hard disk drive 2012, and/or a removable storage drive 2014, representing a floppy disk drive, a magnetic tape drive, an optical disk drive, a universal serial bus (USB) flash drive, etc. The removable storage drive 2014 reads from and/or writes to a removable storage unit 2018 in a well-known manner. Removable storage unit 2018 represents a floppy disk, magnetic tape, optical disk, USB flash drive etc., which is read by and written to removable storage drive 2014. As will be appreciated, the removable storage unit 2018 includes a computer usable storage medium having stored therein computer software and/or data. In some examples, one or more of the main memory 2008, the secondary memory 2010, the removable storage unit 2018, and/or the removable storage unit 2022 may be a non-transitory memory.

Alternative aspects of the present disclosures may include secondary memory 2010 and may include other similar devices for allowing computer programs or other instructions to be loaded into computer system 2000. Such devices may include, for example, a removable storage unit 2022 and an interface 2020. Examples of such may include a program cartridge and cartridge interface (such as that found in video game devices), a removable memory chip (such as an erasable programmable read only memory (EPROM), or programmable read only memory (PROM)) and associated socket, and the removable storage unit 2022 and the interface 2020, which allow software and data to be transferred from the removable storage unit 2022 to computer system 2000.

Computer system 2000 may also include a communications circuit 2024. The communications circuit 2024 may allow software and data to be transferred between computer system 2000 and external devices. Examples of the communications circuit 2024 may include a modem, a network interface (such as an Ethernet card), a communications port, a Personal Computer Memory Card International Association (PCMCIA) slot and card, etc. Software and data transferred via the communications circuit 2024 are in the form of signals 2028, which may be electronic, electromagnetic, optical or other signals capable of being received by the communications circuit 2024. These signals 2028 are provided to the communications circuit 2024 via a communications path (e.g., channel) 2026. This path 2026 carries signals 2028 and may be implemented using wire or cable, fiber optics, a telephone line, a cellular link, an RF link and/or other communications channels. In this document, the terms "computer program medium" and "computer usable medium" are used to refer generally to media such as the removable storage unit 2018, a hard disk installed in hard disk drive 2012, and signals 2028. These computer program products provide software to the computer system 2000. Aspects of the present disclosures are directed to such computer program products.

Computer programs (also referred to as computer control logic) are stored in main memory 2008 and/or secondary memory 2010. Computer programs may also be received via communications circuit 2024. Such computer programs, when executed, enable the computer system 2000 to perform the features in accordance with aspects of the present disclosures, as discussed herein. In particular, the computer programs, when executed, enable the processor 2004 to perform the features in accordance with aspects of the present disclosures. Accordingly, such computer programs represent controllers of the computer system 2000.

In an aspect of the present disclosures where the method is implemented using software, the software may be stored in a computer program product and loaded into computer system 2000 using removable storage drive 2014, hard disk drive 2012, or the interface 2020. The control logic (software), when executed by the processor 2004, causes the processor 2004 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method for detecting an occlusion of an area, comprising:
   receiving an initial image of the area;
   receiving an updated image of the area;
   detecting at least one of a person in the area or a movement in the area based on at least the updated image;
   comparing the updated image and the initial image to identify a change in the area;
   determining a presence of the occlusion based on the change in the area and the at least one of the person or the movement in the area without using machine learning algorithms; and
   in response to determining the presence of the occlusion, the method further comprises:
   detecting the person or the movement;
   generating a first bounding box around the person or the movement;
   generating a second bounding box around the change in the area;
   merging the first bounding box and the second bounding box into a merged bounding box;
   calculating an intersection over union value based on at least one of the first bounding box, the second bounding box, or the merged bounding box;
   comparing the intersection over union value to a threshold value; and
   detecting the occlusion in response to the intersection over union value being greater than the threshold value.

2. The method of claim 1, further comprising: refraining from calculating an available space in the area until a removal of the occlusion occurs.

3. The method of claim 2, further comprising, after the removal of the occlusion, calculating an available space in the area.

4. The method of claim 3, further comprising transmitting a message indicating the available space in the area.

5. The method of claim 4, wherein:
   the area is a shelf in a store; and
   further comprising determining an amount of merchandise to replenish the shelf based on the available space in the shelf, wherein the message comprises an indication indicating the amount of merchandise to be replenished.

6. The method of claim 1, wherein the area is one of a shelf, a line in a store, a waiting area, or a compartment of a transportation vehicle.

7. A system for detecting an occlusion of an area, comprising:
   a memory including instructions; and
   a processor communicatively coupled to the memory and configured to execute the instructions to:
   capture an initial image of the area;
   capture an updated image of the area;
   detect at least one of a person in the area or a movement in the area based at least on the updated image;
   compare the updated image and the initial image to identify a change in the area;

determine a presence of the occlusion based on the change in the area and the at least one of the person or the movement in the area without using machine learning algorithms; and in response to determining the presence of the occlusion, the processor is further configured to:
   detect the person or the movement;
   generate a first bounding box around the person or the movement;
   generate a second bounding box around the change in the area;
   merge the first bounding box and the second bounding box into a merged bounding box;
   calculate an intersection over union value based on at least one of the first bounding box, the second bounding box, or the merged bounding box;
   compare the intersection over union value to a threshold value; and
   detect the occlusion in response to the intersection over union value being greater than the threshold value.

8. The system of claim 7, wherein the processor is further configured to:
   refrain from calculating an available space in the area until a removal of the occlusion.

9. The system of claim 8, wherein the processor is further configured to, after the removal of the occlusion, calculate an available space in the area.

10. The system of claim 9, wherein the processor is further configured to transmit a message indicating the available space in the area.

11. The system of claim 10, wherein:
   the area is a shelf in a store; and
   the processor is further configured to determine an amount of merchandise to replenish the shelf based on the available space in the shelf, wherein the message comprises an indication indicating the amount of merchandise to be replenished.

12. The system of claim 7, wherein the area is one of a shelf, a line in a store, a waiting area, or a compartment of a transportation vehicle.

13. A non-transitory computer readable medium including instructions that, when executed by a processor of a system for detecting an occlusion of an area, cause the processor to:
   capture an initial image of the area;
   capture an updated image of the area;
   detect at least one of a person in the area or a movement in the area based at least on the updated image;
   compare the updated image and the initial image to identify a change in the area;
   determine a presence of the occlusion based on the change in the area and the at least one of the person or the movement in the area without using machine learning algorithms; and in response to determining the presence of the occlusion, the non-transitory computer readable medium further comprises instructions to:
   detect the person or the movement;
   generate a first bounding box around the person or the movement;
   generate a second bounding box around the change in the area;
   merge the first bounding box and the second bounding box into a merged bounding box;
   calculate an intersection over union value based on at least one of the first bounding box, the second bounding box, or the merged bounding box;
   compare the intersection over union value to a threshold value; and
   detect the occlusion in response to the intersection over union value being greater than the threshold value.

14. The non-transitory computer readable medium of claim 13, further comprising instructions that, when executed by the processor, cause the processor to: refrain from calculating an available space in the area until a removal of the occlusion.

15. The non-transitory computer readable medium of claim 14, further comprising instructions that, when executed by the processor, cause the processor to, after the removal of the occlusion, calculate an available space in the area.

16. The non-transitory computer readable medium of claim 15, further comprising instructions that, when executed by the processor, cause the processor to transmit a message indicating the available space in the area.

17. The non-transitory computer readable medium of claim 16, wherein:
   the area is a shelf in a store; and
   further comprising instructions that, when executed by the processor, cause the processor to determine an amount of merchandise to replenish the shelf based on the available space in the shelf, wherein the message comprises an indication indicating the amount of merchandise to be replenished.

18. The non-transitory computer readable medium of claim 13, wherein the area is one of a shelf, a line in a store, a waiting area, or a compartment of a transportation vehicle.

* * * * *